(12) United States Patent
Kimura et al.

(10) Patent No.: US 8,329,109 B2
(45) Date of Patent: Dec. 11, 2012

(54) SEGMENTED REACTORS FOR CAPACITY AND ENRICHMENT CHANGES IN CONVERSION OF URANIUM HEXAFLUORIDE TO URANIUM DIOXIDE

(75) Inventors: Richard Thaddeus Kimura, Richland, WA (US); Andrew Landon, Richland, WA (US); Clifford Yeager, Richland, WA (US)

(73) Assignee: Areva NP, Lynchburg, VA (US)

( * ) Notice: Subject to any disclaimer, the term of this patent is extended or adjusted under 35 U.S.C. 154(b) by 127 days.

(21) Appl. No.: 12/943,704

(22) Filed: Nov. 10, 2010

(65) Prior Publication Data

US 2011/0110837 A1     May 12, 2011

Related U.S. Application Data

(60) Provisional application No. 61/281,172, filed on Nov. 12, 2009.

(51) Int. Cl.
*G21C 1/00* (2006.01)
*B01J 8/18* (2006.01)

(52) U.S. Cl. ........ 422/159; 422/139; 422/141; 422/142; 423/261

(58) Field of Classification Search .................. 422/159, 422/139, 141, 142; 423/261
See application file for complete search history.

(56) References Cited

U.S. PATENT DOCUMENTS

| | | | |
|---|---|---|---|
| 3,179,491 A * | 4/1965 | Wada et al. ................... | 423/261 |
| 4,095,974 A | 6/1978 | Matovich | |
| 4,830,841 A | 5/1989 | Urza | |
| 5,346,684 A | 9/1994 | Mestepey | |
| 5,875,385 A | 2/1999 | Stephenson et al. | |
| 6,352,677 B1 | 3/2002 | Hage et al. | |
| 6,656,391 B1 | 12/2003 | Bonnerot et al. | |
| 7,102,040 B2 * | 9/2006 | Chiu et al. ..................... | 570/164 |
| 2002/0018737 A1 | 2/2002 | Holst et al. | |
| 2004/0052724 A1 | 3/2004 | Sorace | |

FOREIGN PATENT DOCUMENTS

DE     4118882 A1     12/1992

* cited by examiner

*Primary Examiner* — Walter D Griffin
*Assistant Examiner* — Lessanework Seifu
(74) *Attorney, Agent, or Firm* — Davidson, Davidson & Kappel, LLC

(57) ABSTRACT

A dry conversion reactor for converting uranium hexafluoride to uranium dioxide, the dry conversion reactor including a gas-phase reaction segment and a fluidized bed segment, wherein at least one of the gas-phase reaction segment and the fluidized bed segment is a replaceable segment. A method for operating a dry conversion reactor utilizing a uranium hexafluoride to uranium dioxide conversion process, the method including replacing at least one conversion reactor segment.

20 Claims, 3 Drawing Sheets

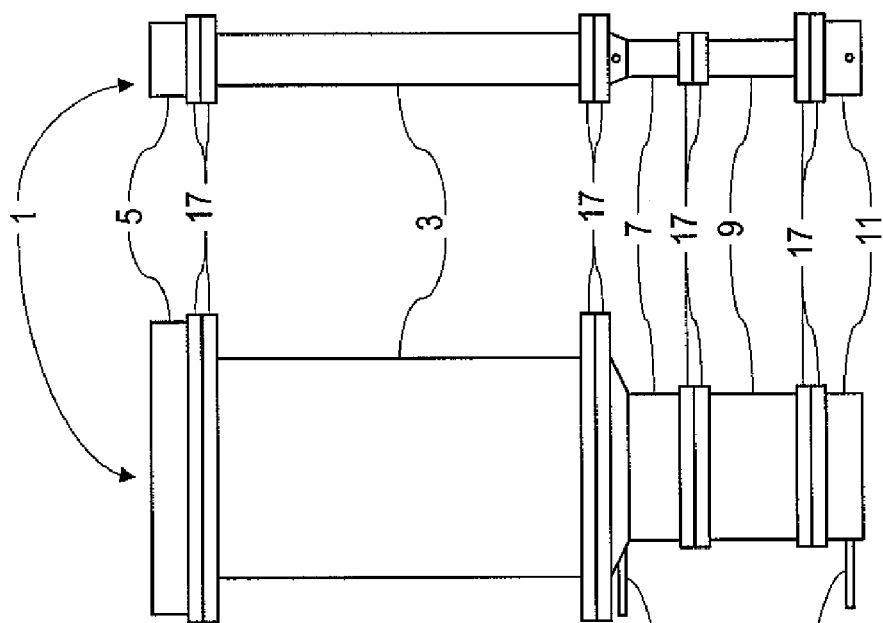
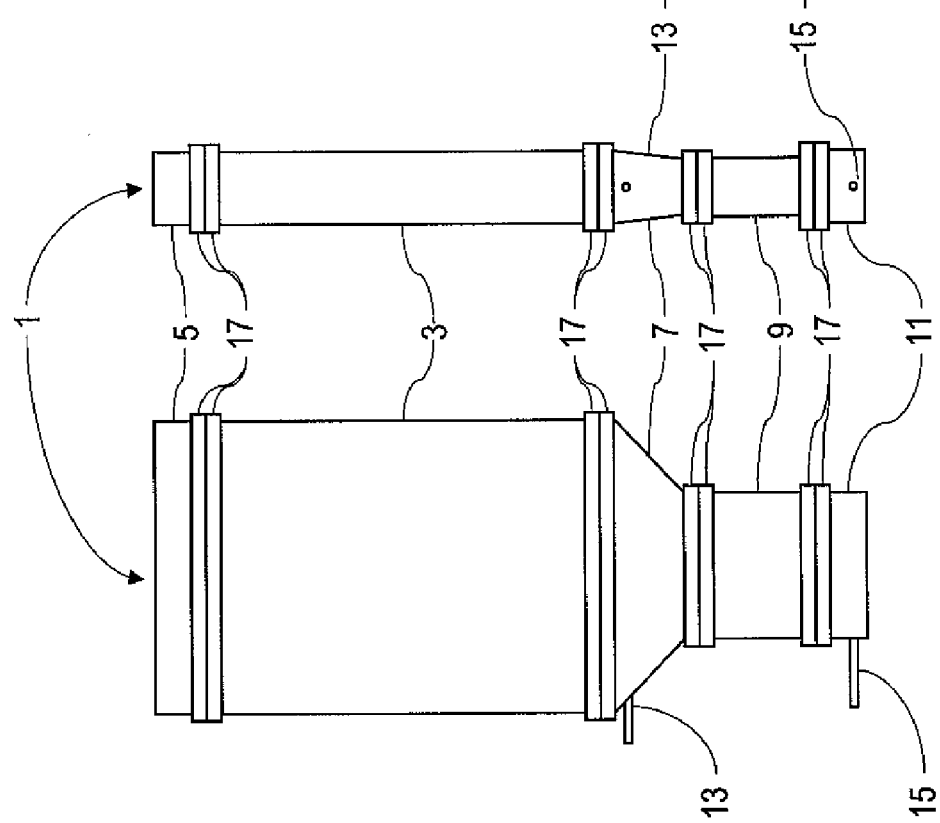

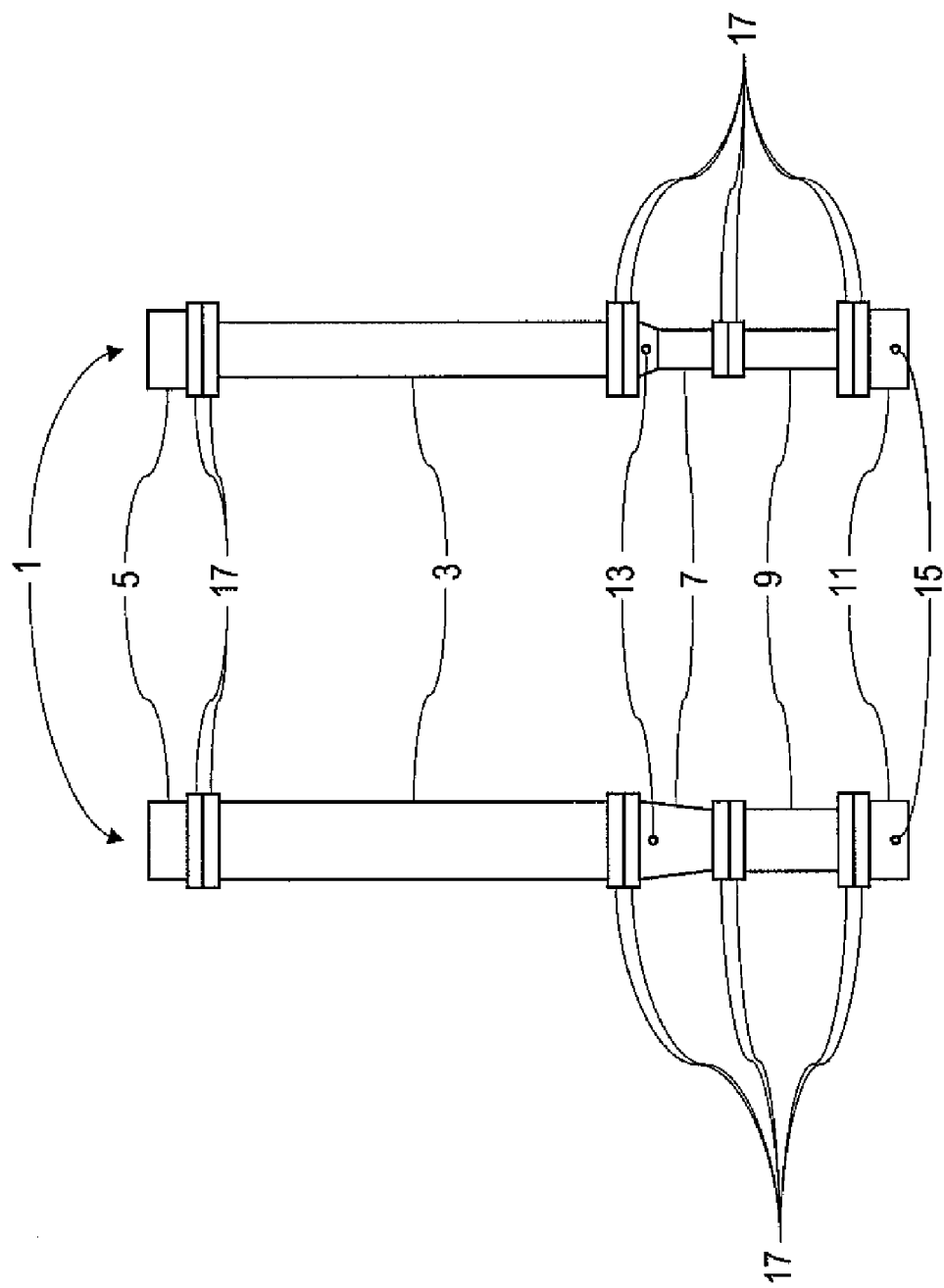

SEGMENTED REACTORS FOR CAPACITY AND ENRICHMENT CHANGES IN CONVERSION OF URANIUM HEXAFLUORIDE TO URANIUM DIOXIDE

Priority to U.S. Provisional Patent Application Ser. No. 61/281,172 filed Nov. 12, 2009, is claimed, the entire disclosure of which is hereby incorporated by reference.

This invention relates to the dry conversion process of uranium hexafluoride to uranium dioxide.

BACKGROUND

U.S. Pat. No. 6,656,391 discloses a process for preparing a castable powder of uranium dioxide ($UO_2$) for the use in the manufacture of MOX fuels. The process includes spray drying of a flowable $UO_2$ powder obtained by dry process conversion of uranium hexafluoride ($UF_6$).

U.S. Pat. No. 6,352,677 discloses a process to produce commercial grade anhydrous hydrogen fluoride (AHF) and $UO_2$ from the defluorination of $UF_6$.

U.S. Pat. No. 5,346,684 discloses a method for recovering an anhydrous hydrogen fluoride from depleted $UF_6$.

U.S. Pat. No. 4,830,841 discloses a $UF_6$ to $UO_2$ dry conversion reactor. Such a conversion is currently done in a single segment reactor with a gas-phase reaction section and a defluorination/agglomeration section which are fixed for running up to the enrichment level required in commercial light water reactors to produce a controlled nuclear reaction, i.e. up to a maximum enrichment of 5% U-235. The upper portion of the reactor separates the solid from the gas phase using sintered metal filters. The $UO_2F_2$ is defluorinated and the $UO_2$ is agglomerated in the lower portion of the reactor using a fluidized bed. Both the fixed fluidized bed and gas-phase reaction sections geometries do not allow for timely or cost effective changes to capacity or U-235 enrichment, or ease of maintenance.

Current dry conversion reactors are usually made of material typically used in high temperature applications such as nickel-chromium based superalloys, e.g. Inconel®625, or of material resistant to corrosion such as nickel-copper based alloys, e.g. Monel®, but reactor modifications and maintenance cannot be done on the dry conversion reactors without welding on aged and thermal-cycled materials. Reactors cannot be quickly upgraded in the fluidized bed section except by welding new metal to modify the geometry. Welding on old materials such as Inconel® 625 or Monel® can cause problems with cracking at the welds between the aged and thermal-cycled reactor metal and the new sections. Unless the whole reactor is heat treated, cracking can occur at the weld seams since the aged thermal-cycled metal is dissimilar to the new metal which is more amorphous. Cracking will occur in a short time, typically soon after installation at the restart of operation. Any changes to a gas-phase reactor or a fluidized bed section of an existing reactor design, up to and including a full reactor replacement, are very expensive. Furthermore, although the entire reactor itself can undergo heat treatment, this is very costly and time consuming.

In addition, current reactors are limited to a fixed capacity and enrichment capability with respect to the gas-phase reaction section and the fluidized bed section. They cannot tolerate feeds greater than 5% enrichment without being replaced. These reactors cannot be upgraded unless the fluidized bed section or the gas-phase reaction section are cut out and new geometry sections are welded on, and these can fail from cracking at weld seams.

SUMMARY OF THE INVENTION

Current dry conversion reactors are welded in a single piece and therefore cannot be easily modified for changes related to capacity, enrichment, modification or other desired changes. An object of the invention is to provide a method and apparatus to modify a dry conversion reactor, such as the fluidized bed or other reactor sections in a simple and cost effective manner.

The present invention provides a dry conversion reactor for converting uranium hexafluoride to uranium dioxide, the dry conversion reactor comprising a gas-phase reaction segment; and a fluidized bed segment, wherein at least one of the gas-phase reaction segment and the fluidized bed segment is a replaceable segment.

The present invention also provides a method for operating a dry conversion reactor utilizing a uranium hexafluoride to uranium dioxide conversion process, the method comprising replacing at least one replaceable conversion reactor segment.

The present invention of installing pre-designed segments is applicable to a wide range of configurations including other reactor sections such as the fluidized bed plenum connecting to the powder outlet, or the off-gas plenum segment connecting to the off-gas outlet.

BRIEF DESCRIPTION OF THE DRAWINGS

One embodiment of the present invention is shown with respect to the drawings in which:

FIG. 1a shows exemplary capacity modifications using replaceable segments on the dry conversion reactor for a rectangular cross section geometry in a front view of a lower capacity reactor;

FIG. 1b shows exemplary capacity modifications using replaceable segments on the dry conversion reactor for a rectangular cross section geometry in a side view of the lower capacity reactor shown in FIG. 1a;

FIG. 2a shows exemplary enrichment modifications using replaceable segments on the dry conversion reactor for a rectangular cross section geometry in a front view of a reactor designed for a lower enrichment;

FIG. 2b shows exemplary enrichment modifications using replaceable segments on the dry conversion reactor for a rectangular cross section geometry in a side view of the reactor designed for the lower enrichment shown in FIG. 2a;

FIG. 2c shows exemplary enrichment modifications using replaceable segments on the dry conversion reactor for a rectangular cross section geometry in a front view of a reactor designed for a higher enrichment;

FIG. 2d shows exemplary enrichment modifications using replaceable segments on the dry conversion reactor for a rectangular cross section geometry in a side view of the reactor designed for the higher enrichment shown in FIG. 2c;

FIG. 3a shows exemplary enrichment modifications using replaceable segments on the dry conversion reactor for a cylindrical geometry with a front view of a reactor designed for a lower enrichment; and FIG. 3b shows exemplary enrichment modifications using replaceable segments on the dry conversion reactor for a cylindrical geometry with a front view of a reactor designed for a higher enrichment.

DETAILED DESCRIPTION

U.S. Pat. No. 4,830,841, incorporated by reference herein, is improved to allow for higher capacity, higher % U-235 enrichments, ease of modification, ease of maintenance and other such improvements while maintaining a high total operating efficiency with minimal process downtime.

The present invention provides a method and apparatus for increasing the capacity of the reactor fluidized bed and modifying the uranium enrichment of existing conversion reactors to 5% U-235 or higher enrichments. This may be done using for instance a slab or cylindrical geometry for nuclear criticality safety. For the purposes of this invention the term slab is used to define a geometry that has a rectangular cross section, the maximum width of the rectangular cross section being determined by criticality safety considerations.

The present invention improves the reactor operations of U.S. Pat. No. 4,830,341 by detailing how the capacity and allowable feed of % U-235 enrichment to the gas-phase reaction section and fluidized bed section can be modified using replaceable segments. Such replaceable segments may include flanged replaceable segments in a variety of configurations.

Figures 1C, 1D:
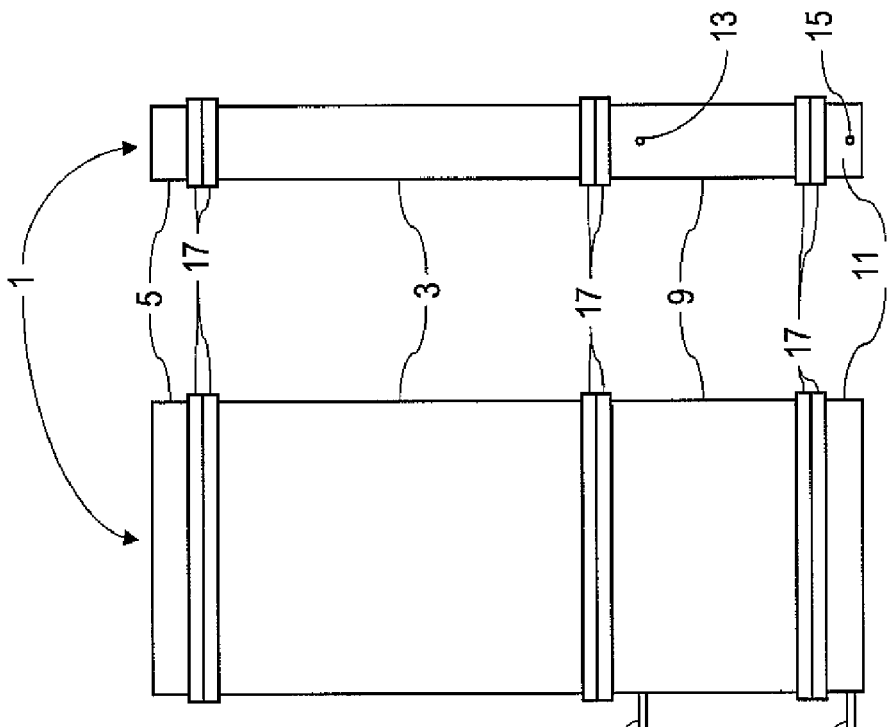
FIG. 1c shows exemplary capacity modifications using replaceable segments on the dry conversion reactor for a rectangular cross section geometry in a front view of a higher capacity reactor.
FIG. 1d shows exemplary capacity modifications using replaceable segments on the dry conversion reactor for a rectangular cross section geometry in a side view of the higher capacity reactor shown in FIG. 1c.
Figures 1A, 1B:
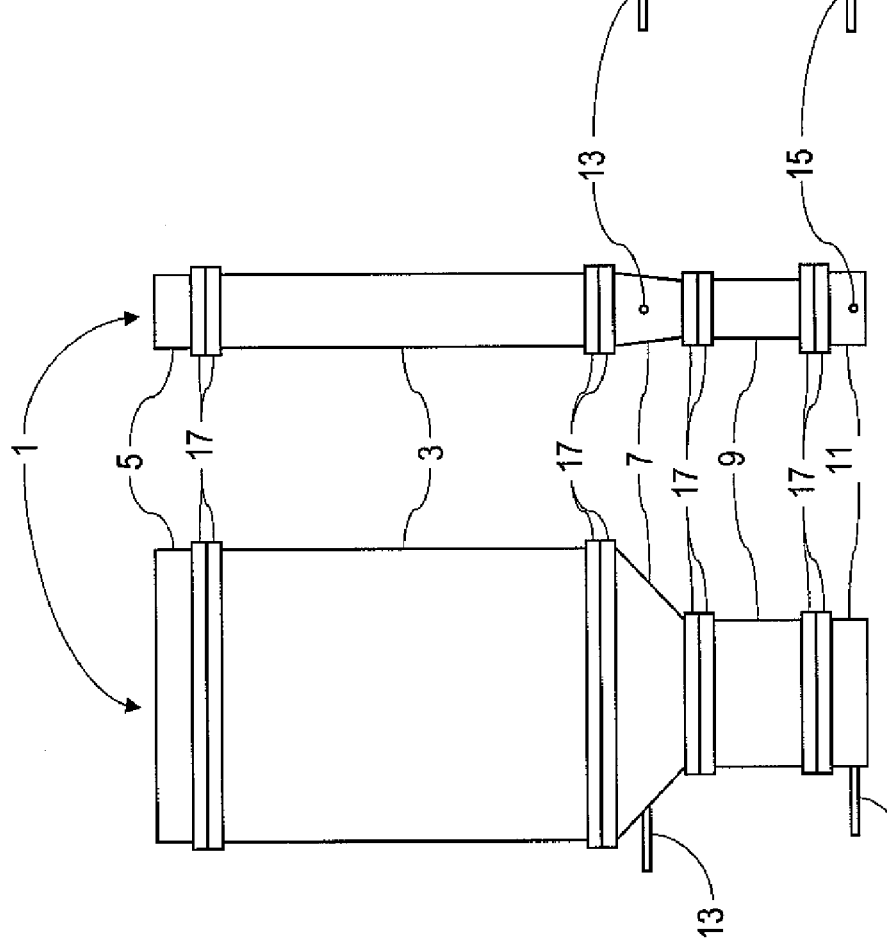

FIGS. 1a to 1d, FIGS. 2a to 2d and FIGS. 3a and 3b show different example modes of modifications to a dry conversion reactor using replaceable segments. Reactor 1 comprises a gas-phase reaction segment 3 connected at one end to a off-gas plenum 5 and at the other end to a transition segment 7 and a fluidized bed segment 9 connected at one end to the transition segment 7 and at the other end to a fluidized bed plenum 11, $UF_6$, steam and H2 are injected through nozzles or pipes 13, 15 into transition segment 7 and fluidized bed plenum 11, respectively. The different components of reactor 1 are connected by weld free connections such as flange connections 17. As discussed in U.S. Pat. No. 4,830,841 the upper portion of reactor 1 separates the solid from the gas phase using sintered metal filters implemented in the gas-phase reaction segment 3 and the $UO_2F_2$ is defluorinated and the $UO_2$ is agglomerated in the fluidized bed segment 9. Usually the design of the gas-phase reaction segment 3 is linked to the process and is not determined by the safety analysis. The design of the fluidized bed segment 9 is defined by process needs, with the width constrained by criticality safety considerations.

As shown in FIGS. 1a to 1d, replaceable segment 9 allows for expansion of the fluidized bed volume and consequently for increased capacity, $UO_2F_2$ residence time and improves the reactor throughput. In extreme cases transition segment 7 may be eliminated to obtain a continuous size all along reactor 1. Replaceable segments, such as gas-phase reaction segment 3, transition segment 7 and fluidized bed segment 9 eliminate the need to weld on the aged gas-phase reaction section 3 or fluidized bed section 9 that are in service. Replaceable segments can also be used to quickly replace an aged segment. Fluidized bed segments 9 can be replaced easily with segments made for instance of other metals, such as switching from Monel® to Inconel®625 or others without welding. Any segments such as gas-phase reaction segment 3, transition segment 7 and fluidized bed segment 9 as well as off-gas plenum 5 and fluidized bed plenum 11 can be removed, repaired and replaced quickly as needed to maintain a higher operating efficiency. When the used segments are removed from service, they can more easily be heat treated to restore the original properties and then put back in service. Modifications to the segments can be done after heat treating and the modified segments can then be reinserted back into position.

As shown in FIGS. 2a to 2d, replaceable segments such as gas-phase reaction segment 3, transition segment 7 and fluidized bed segment 9, can be used to run higher enrichments through the reactor quickly by adjusting the following parameters in order to ensure criticality safety. For example, the following relationship for fluidized bed width, minimum critical mass, minimum critical volume, and minimum critical concentration would all be factored into the fluidized bed segment volume for different desired enrichments.

| U-235 (w/o) Enrichment | "Slab" Width (m) | Min. Critical Mass (Kg) | Min Critical Volume (l) | Min. Critical Conc. (gU/l) |
| --- | --- | --- | --- | --- |
| 6.0 | 0.1118 | 28 | 23.0 | 230 |
| 7.0 | 0.1041 | 22 | 19.2 | 190 |
| >7.0 | Calculated as needed for any enrichment up to 100% | | | |

The maximum fluidized bed width, determined by criticality safety calculations for a specific maximum enrichment, would represent the inside width of the replaceable fluidized bed segment.

As shown in FIGS. 3a and 3b, in addition, a cylindrical geometry can be addressed using replaceable segments such as gas-phase reaction segment 3, transition segment 7 and fluidized bed segment 9 as well. Such a geometry would be applicable for higher U-235 enrichments, as an example as to how criticality safety would be maintained. But, the concept and method are not limited to these. Examples of higher U-235 enrichments are as follows for a safe cylindrical geometry:

| U-235 (w/o) | Cylinder Diameter (m) |
| --- | --- |
| 6.0 | 0.2413 |
| 7.0 | 0.2235 |
| >7.0 | Calculated as needed for any enrichment up to 100% |

The segments can be designed to quickly change a configuration to the needed capacity, residence time, maintenance or replacement work, criticality safety parameters, or other work requiring quick segment changes.

In addition to capacity and enrichment changes, larger fluidized beds are a process improvement that allow for better defluorination and additional densification, if needed. The replaceable reactor segments may be used to quickly increase or decrease capacity in either gas phase reaction or defluorination/agglomeration fluidized bed sections of the reactor. This provides a way of quickly providing the appropriate increase to fluidized bed volume, and lead to high quality powder for making active (ceramically) and sinterable powder using the methodology discussed in U.S. Pat. No. 4,830,841.

Reactor 1 is built to pressure vessel code. The use of segments improves the current conditions. Repairs to existing reactors, per U.S. Pat. No. 4,830,841, may be done by quickly replacing segments. When segmented sections of the reactor can be more easily modified or repaired, spare segments may be kept on hand to ensure higher production efficiency and minimal downtime. Segments are also much easier to heat treat to restore the metal to its original properties than an entire reactor.

Modification or repair of an old segment can be done, such as welding on a new pipe flange, and the segment can be heat treated in a cost effective way of restoring the metallic properties for reuse. This would include removing the old segment, replacing the defective part or implementing the new changes, for instance by welding, heat treating, reinstalling, etc. Alternatively a spare replacement segment having all of the necessary modifications made to it may be substituted in the place of the old segment which would then be repaired or modified by welding and heat treatment.

The connections between the replaceable segments could use a tubular gasket made of Inconel® or Monel®, coated with silver, for sealing, compressed by nuts and bolts on the flange. Other materials and coatings may also be used. Nozzles, or pipes, with flanges connected to the replaceable segments may be connected with ring joints using copper, nickel or other ring material. HF or uranium leaks from the reactor can be quickly stopped by replacing the damaged or cracked segment or gasket.

Staybolts, rods or internal structural supports, which provide rigidity to the reactor, can also be mechanically sealed with flanged fittings so as to eliminate the need to weld old-new materials.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A dry conversion reactor for converting uranium hexafluoride to uranium dioxide, the dry conversion reactor comprising:
   a fluidized bed segment;
   a gas-phase reaction segment;
   an off-gas plenum; and
   a fluidized bed plenum,
   the fluidized bed segment, the gas-phase reaction segment, the off-gas plenum and the fluidized bed plenum being coupled together,
   at least one of the fluidized bed segment, the gas-phase reaction segment, the off-gas plenum and the fluidized bed plenum being a replaceable conversion reactor segment.

2. The dry conversion reactor as recited in claim 1 wherein the at least one replaceable conversion reactor segment allows for changes to a capacity, an enrichment, a material or for maintenance.

3. The dry conversion reactor as recited in claim 1 wherein the at least one replaceable conversion reactor segment is reinserted after being repaired or modified.

4. The dry conversion reactor as recited in claim 1 wherein the at least one replaceable conversion reactor segment is replaced by a spare conversion reactor segment.

5. The dry conversion reactor as recited in claim 1 wherein the at least one replaceable conversion reactor segment has a rectangular or cylindrical cross-section.

6. The dry conversion reactor as recited in claim 1 wherein the at least one replaceable conversion reactor segment is joined with a flanged connection and a tubular gasket.

7. A method for operating a dry conversion reactor utilizing a uranium hexafluoride to uranium dioxide conversion process, the dry conversion reactor including a fluidized bed segment, a gas-phase reaction segment, an off-gas plenum and a fluidized bed plenum coupled together, the method comprising:
   modifying the dry conversion reactor by replacing at least one of the fluidized bed segment, the gas-phase reaction segment, the off-gas plenum and the fluidized bed plenum.

8. The method as recited in claim 7 wherein replacing the at least one replaceable conversion reactor segment is for changing a capacity, an enrichment, a material or for maintenance.

9. The method as recited in claim 7 wherein the at least one replaceable conversion reactor segment is reinserted after the at least one replaceable conversion reactor segment is repaired or modified.

10. The method as recited in claim 7 wherein the at least one replaceable conversion reactor segment is replaced by a spare conversion reactor segment.

11. The method as recited in claim 7 wherein the at least one replaceable conversion reactor segment is a fluidized bed segment, a gas-phase reaction segment, a off-gas plenum, a transition segment or a fluidized bed plenum.

12. The method as recited in claim 11 wherein the at least one replaceable conversion reactor segment used has a rectangular or a cylindrical cross section.

13. The method as recited in claim 7 further comprising joining the at least one replaceable conversion reactor segment with a flanged connection and a tubular gasket.

14. The method as recited in claim 7 further comprising:
   operating the dry conversion reactor for a first uranium enrichment before replacing at least one replaceable conversion reactor segment; and
   operating the modified dry conversion reactor for a second uranium enrichment different from the first uranium enrichment after replacing at least one replaceable conversion reactor segment.

15. The method as recited in claim 14 wherein the first uranium enrichment is a U-235 enrichment of less than or equal to 5% and the second uranium enrichment is a U-235 enrichment of greater than 5%.

16. The method as recited in claim 7 wherein modifying the dry conversion reactor by replacing at least one replaceable conversion reactor segment includes removing a first conversion reactor segment of a first material and replacing the first conversion segment with a second conversion reactor segment of a second material different from the first material.

17. The method as recited in claim 7 wherein modifying the dry conversion reactor by replacing at least one replaceable conversion reactor segment includes removing a first conversion reactor segment of a first geometry and replacing the first conversion segment with a second conversion reactor segment of a second geometry different from the first geometry.

18. The method as recited in claim 17 wherein modifying the dry conversion reactor by replacing at least one replaceable conversion reactor segment includes removing a first conversion reactor segment of a first volume and replacing the first conversion segment with a second conversion reactor segment of a second volume different from the first volume.

19. A dry conversion reactor for converting uranium hexafluoride to uranium dioxide, the dry conversion reactor comprising:
   a gas-phase reaction segment; and
   a fluidized bed segment, wherein at least one of the gas-phase reaction segment and the fluidized bed segment is a replaceable segment including a first end configured for removably coupling the replaceable segment to the gas-phase reaction segment or the fluidized bed segment.

20. The dry conversion reactor recited in claim 19 further comprising at least one plenum, the replaceable segment including a second end configured for removably coupling the replaceable segment to one of the at least one plenum.

* * * * *